US012456565B2

United States Patent
Glazer et al.

(10) Patent No.: US 12,456,565 B2
(45) Date of Patent: Oct. 28, 2025

(54) FERROFLUID

(71) Applicant: MyneIP B.V., Harderwijk (NL)

(72) Inventors: Piotr Jakub Glazer, Delft (NL);
Shriya Reddy Paida, Rotterdam (NL);
Peter Carlo Rem, Rijswijk (NL)

(73) Assignee: MYNEIP B.V., Harderwijk (NL)

( * ) Notice: Subject to any disclaimer, the term of this patent is extended or adjusted under 35 U.S.C. 154(b) by 948 days.

(21) Appl. No.: 17/594,904

(22) PCT Filed: May 7, 2020

(86) PCT No.: PCT/NL2020/050293
§ 371 (c)(1),
(2) Date: Nov. 2, 2021

(87) PCT Pub. No.: WO2020/226497
PCT Pub. Date: Nov. 12, 2020

(65) Prior Publication Data
US 2022/0351887 A1    Nov. 3, 2022

(30) Foreign Application Priority Data

May 7, 2019 (NL) ...................................... 2023082

(51) Int. Cl.
*H01F 1/44* (2006.01)
*B03C 1/033* (2006.01)
(Continued)

(52) U.S. Cl.
CPC ........... *H01F 1/445* (2013.01); *B03C 1/0332* (2013.01); *B03C 1/288* (2013.01); *H01F 41/00* (2013.01);
(Continued)

(58) Field of Classification Search
CPC ....................................................... H01F 1/445
See application file for complete search history.

(56) References Cited

U.S. PATENT DOCUMENTS

| 4,701,276 A | 10/1987 | Wyman |
| 5,851,416 A * | 12/1998 | Raj ........................... H01F 1/44 252/62.52 |

(Continued)

FOREIGN PATENT DOCUMENTS

| CN | 106673072 | 5/2017 |
| EP | 0859379 | 8/1998 |

(Continued)

OTHER PUBLICATIONS

JP Final Office Action, Application No. 2021-566039, Japanese Patent Office, dated Mar. 11, 2024, 7 pages.

*Primary Examiner* — Peter F Godenschwager
(74) *Attorney, Agent, or Firm* — Quarles & Brady LLP (57) ABSTRACT

The invention is directed to a method and a system for producing a ferrofluid comprising providing a stock solution with Fe(II) and Fe(III); mixing the stock solution with a base to form magnetic nanoparticles and a spent solution, said method further comprising a separation step of separating the nanoparticles from the spent solution by applying a magnet to immobilize the nanoparticles and remove at least part of the spent solution as supernatant from the immobilized nanoparticles. In another aspect, the invention is directed to the resulting ferrofluid.

12 Claims, 3 Drawing Sheets

(51) Int. Cl.
  *B03C 1/28* (2006.01)
  *B82Y 25/00* (2011.01)
  *B82Y 40/00* (2011.01)
  *H01F 41/00* (2006.01)

(52) U.S. Cl.
  CPC ........... *B03C 2201/18* (2013.01); *B82Y 25/00* (2013.01); *B82Y 40/00* (2013.01)

(56) References Cited

U.S. PATENT DOCUMENTS

| | | | |
|---|---|---|---|
| 5,958,282 A | 9/1999 | Raj et al. | |
| 2005/0178701 A1* | 8/2005 | Roth | B03C 1/0332 209/636 |

FOREIGN PATENT DOCUMENTS

| | | |
|---|---|---|
| EP | 880149 | 11/1998 |
| EP | 2894637 | 7/2015 |
| JP | S5465182 | 5/1979 |
| JP | S63-115308 | 5/1988 |
| JP | H04-81498 | 3/1992 |
| JP | H10-241928 | 9/1998 |
| JP | A2002-075724 | 3/2002 |
| JP | 2007167850 A | 7/2007 |
| JP | 2012507153 A | 3/2012 |
| JP | 4984998 B2 | 7/2012 |
| JP | 2015160801 A | 9/2015 |
| JP | 2001167919 | 9/2017 |
| WO | WO2014/038713 | 3/2014 |

\* cited by examiner

FERROFLUID

RELATED APPLICATIONS

This application is a 35 U.S.C. § 371 national phase application of PCT/NL2020/050293 (WO 2020/226497), filed on May 7, 2020, entitled "FERROFLUID", which application claims the benefit of Netherlands Application No. 2023082, filed May 7, 2019, which is incorporated herein by reference in its entirety.

TECHNICAL FIELD AND BACKGROUND

The present invention relates to the production of ferrofluids. In particular, the invention relates to ferrofluid production on an industrial scale.

Ferrofluids are liquids that become strongly magnetized in the presence of a magnetic field and find useful applications in separation technologies such magnetic density separation (MDS). In MDS, a magnetic processing fluid (also referred to as ferrofluid) is used as separation medium. A typical example of such a process is described in EP1800753, incorporated herein in its entirety. Other examples are found in WO 2014/158016 and WO 2015/050451, also incorporated herein in their entirety. MDS is used in processing of raw materials for the classification of mixed streams into streams with particles of different types of materials. For these MDS applications, ferrofluids are typically essential.

In general, ferrofluid are colloidal fluids of ferromagnetic or ferrimagnetic nanoparticles (herein also referred to as magnetic nanoparticles) that are suspended in a carrier fluid such as water or oil. In typical embodiments, the magnetic nanoparticles are based on magnetic iron oxides such as magnetite ($Fe^{2+}Fe^{3+}{}_2O_4$ or simply $Fe_3O_4$) and maghemite ($\gamma$-$Fe_2O_3$). In particular magnetite is used.

Ferrofluids are typically prepared by ball milling or grilling of iron-containing powders (top down approach). U.S. Pat. No. 5,958,282 discloses for instance grinding of a nonmagnetic $\alpha Fe_2O_3$ powder in the presence of a surfactant.

In another approach (bottom up approach), iron ions can be precipitated using a base such as sodium hydroxide to form irons oxides. Examples hereof are described in CN106673072 and EP0859379. Drawbacks of these bottom up approaches often include the requirement of organic solvents for purification and the use of heat. The bottom up approaches are typically poorly scalable to an industrial scale. In addition, the use of organic solvents requires special purification treatments of the waste streams that are concomitantly produced with the ferrofluid.

An aspect of the present invention is to provide an efficient process that is scalable and allows the industrial scale production of ferrofluids and does not suffer from at least one of the above-mentioned drawbacks.

SUMMARY

Aspects of the present disclosure relate to a method of producing a ferrofluid comprising providing a stock solution with Fe(II) and Fe(III); mixing the stock solution with a base to form magnetic nanoparticles and a spent solution. Particularly advantageous is that the method further comprises a separation step of separating the nanoparticles from the spent solution by applying a magnet to immobilize the nanoparticles to remove at least part of the spent solution as supernatant from the immobilized nanoparticles.

The present inventors found that the magnetic properties of the nanoparticles can be used to their advantage in the production of the ferrofluid. This enables a semi-continuous and well-scalable process for the production of the ferrofluid.

In a further aspect, the invention is directed to a system for producing a ferrofluid, the system comprising:
- a first supply chamber for supplying a stock solution;
- a second supply chamber for supplying a base;
- a mixing container configured to receive and mix the stock solution with the base, wherein the stock solution reacts with the base to form a suspension of nanoparticles
- a third supply chamber for supplying demineralized water to the mixing container;
- a waste container for receiving waste water from the mixing container;
- a magnet configured to allow immobilization of the nanop articles;
- a fourth supply chamber for supplying a surfactant.

BRIEF DESCRIPTION OF DRAWINGS

These and other features, aspects, and advantages of the apparatus, systems and methods of the present disclosure will become better understood from the following description, appended claims, and accompanying drawing wherein FIGS. 1, 2 and 4 each illustrate a system (200) for producing a ferrofluid (Lf).

DESCRIPTION OF EMBODIMENTS

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

The present invention is directed to a method of producing a ferrofluid comprising providing a stock solution with Fe(II) and Fe(III); mixing the stock solution with a base to form magnetic nanoparticles and a spent solution, wherein the method further comprising a separation step of separating the nanoparticles from the spent solution by applying a magnet to immobilize the nanop articles to remove at least part of the spent solution as supernatant from the immobilized nanoparticles.

In principle, the stock solution can be obtained in any feasible way, e.g. mixing solutions of ferrous chloride and ferric chloride, e.g. in relative molar amounts preferably as close as possible to 1:2 if magnetite nanop articles are desired. However, it will be appreciated that the use of magnetic ore as starting material, the desired relative amount to later form the ferrofluid with magnetic nanop articles may be automatically satisfied. So this may simplify the procedure and reduce waste material. This principle can be applied for any type of ferrofluid. Accordingly, in a preferred embodiment, the stock solution is produced as described in NL2022821 (which is incorporated herein in its entirety).

The base may comprise any suitable base such as an alkali, ammonia, magnesium hydroxide, or a combination thereof, preferably an alkali selected from the group consisting of sodium hydroxide, potassium hydroxide, calcium hydroxide, or a combination thereof. The base is typically dissolved in an aqueous solution such as water.

The mixing of the stock solution and the base is typically performed in a mixing container with a mixing tool configured to stir the suspension. Suitable examples of mixing tools include anchor impellers and stirring rods. These tools are generally powered by a motor.

The base reacts with the Fe(II) and Fe(III) of the stock solution to form the nanop articles and stimulate the growth of these particles. The inventors found that maintaining a certain pH during the growth of the nanoparticles influence the particle size of the nanoparticles. In addition, the time duration is an influencing factor, see also Baumgartner et al. Nature Materials 12 (2013) 310-314.

In an embodiment, excess base is added fast to the stock solution to obtain a pH to above 11, preferably about 10. After about 5-10 minutes, the separation step is carried out, This embodiment yields nanoparticles with an average size of about 7 nm.

In another embodiment, base is added carefully to the stock solution to obtain a pH to about 7.5 to 8.5, preferably about 8. Preferably, care is taken that the pH does not exceed a threshold at which the particle growth would possibly be suppressed by competing nucleation of new particles. For a stock solution based on iron chloride and/or iron sulfate, this threshold lies typically about a pH of 10. Next, the pH of the reaction mixture (i.e. the stock solution with the base) is maintained at about 8.5 for about 10-20 minutes (e.g. by using a small base dosing pump that is controllably connected to the pH sensor), after which the separation step is carried out. This embodiment yield nanoparticles with an average size of about 9.5 nm.

In yet another embodiment, base is added to the stock solution to obtain a pH of less than 5, preferably less than 4. This low pH is preferably maintained for 5 to 15 minutes such as about 10 minutes. The initially low pH can promote the hydroxylation of ferric ions (see also Gnanaprakash et al. Materials Chemistry and Physics 103 (2007) 168-175). Then, additional base is added to the reaction mixture to obtain a pH to about 7.5 to 8.5, preferably about 8. Again, care is preferably taken that the pH does not exceed a threshold at which the particle growth would possibly be suppressed by competing nucleation of new particles. For a stock solution based on iron chloride and/or iron sulfate, this threshold lies about a pH of 10. Next, the pH of the reaction mixture (i.e. the stock solution with the base) is maintained at about 8.5 for about 5 to 30 minutes, preferably 10 to 20 minutes, after which the separation step is carried out. This embodiment yield nanoparticles with an average size of about 11 nm.

Accordingly, the method according to the present invention preferably comprises controlling the pH in a range of about 7.5 to about 8.5 for about 5 to 30 minutes, preferably 10 to 20 minutes, which is preceeded by bring the pH to less than 5 or to a range between 7.5 and 10, preferably about 8.

The average size of the nanoparticles typically influences the way the nanop articles can be applied. For instance, the control of average particle size is of high importance for many industrial applications as it is directly correlated with magnetization value.

The method comprises a separation step of separating the nanoparticles from the spent solution by applying a magnet to immobilize the nanop articles and remove at least part of the spent solution as supernatant from the immobilized nanoparticles. This separation step is preferably followed by one or more additional washing steps, each washing step comprising releasing the nanoparticles from the magnetic immobilization, mixing the released nanoparticles with a washing solution which preferably comprises water, re-immobilizing the nanop articles with the magnet and removing at least part of the used washing solution as supernatant from the immobilized nanoparticles. This repeated washing enables efficient purification of the nanoparticles that are produced. The washing solution preferably comprises water, more preferably demineralized water. The resulting washed nanop articles are typically in an aqueous suspension (also referred herein as an aqueous nanosuspension).

As an example, the washing process may comprise the following consecutive steps: switching the mixing tool off, moving the magnet in below the mixing container, waiting for particles to settle, activating the pump for removal of waste liquid, moving the magnet out, activating the pump for input of water, switching the mixing tool on, switching the mixing tool off, moving the magnet in below the reactor, waiting for particles to settle, activating the pump for removal of waste water, repeat all these steps, preferably one time or more, e.g. four times. Preferably, repeating them at least one time. The washing solution is advantageously supplied in the mixing container to remove excess ions left after the reaction between the stock solution and base, wherein supernatant waste liquid with ions is disposed into a waste container. Advantageously, the washing cycles may reduce the concentration of ions in the solution, increase the nanop article zeta potential and make dispersion and coating layer formation easier.

The magnet can be provided adjacent to an exit tube out of the mixing container (e.g. below the mixing container to pull the nanop articles downward) and is typically switchable to intermittently pull or immobilize the nanoparticles. The magnet may also be positioned away from the exit, to limit accidental escape of the nanoparticles through the exit. A switchable magnet can be achieved in various ways. For instance, the magnet may comprise a permanent magnet on a motorized stage to controllably place the permanent magnet adjacent to the exit tube. Alternatively, or additionally, the magnet comprises a switchable electromagnet.

The mixing container preferably comprises a flat bottom under which the magnet is positioned. In a preferred embodiment, the magnet is within a 10 mm distance from the solution, e.g. 5 mm or less. The magnet is preferably arranged in a Halbach array to maximize the penetration depth of the magnetic field in the reactor. In a preferred embodiment, immobilization of the nanop articles is reached in less than 10 minutes, preferably in 2 to 6 minutes. Immobilization of the nanoparticles in later washing steps generally take less time than in earlier washing steps.

Advantageously, the separation and washing steps according to the present invention reduces the electrical conductivity of the resulting nanop articles (herein also referred to as a nanosuspension (Ln)). The electrical conductivity is representative of the number of remaining ions in the nanosuspension. A reduced electrical conductivity increases the zeta potential of the magnetite particles and was surprisingly also found to make dispersion and coating with a surfactant easier. The separation step in accordance with the present invention enables the reduction of an electrical conductivity of 60 mS/cm or more to 1 mS/cm or less. This low electrical conductivity limits or removes the requirement of extra washing steps with organic solvents and/or thermal processes such as heating during the coating, as is generally used in conventional processes.

In a most preferred embodiment, all process steps are carried out at a temperature below 45° C., for instance below 30° C. The process may also be carried out such that only one or more of the process steps are carried out below that temperature threshold. Preferably, at least the one or more washing steps and/or the coating step is carried out at a temperature below 45° C. such as below 30° C. These low process temperatures are enabled by the efficient washing and immobilization steps before the coating takes place.

The combined optimization of the magnet, the mixing container and volumes thereof enable automation of the separation and washing steps, which is beneficial for a good reproducibility and scalability of the process.

In a preferred embodiment, the mixing container is connected to be supplied a washing solution from a washing solution container and preferably to a waste container to hold waste liquid (i.e. the separated spent solution) as well.

After the separation and washing steps, the resulting nanoparticles (herein also referred to as a nanosuspension (Ln)), can be coated with a surfactant in a next step, a coating step. This coating is preferably carried out in a separate vessel (e.g. an ultrasonic unit) or system of several vessels by applying ultrasonic waves, milling with attrition balls or a combination thereof to the nanosuspension to disperse and coat the particles with the surfactant, thereby producing the ferrofluid. Alternatively, washing and coating is carried out in one reactor, but this is less preferred because the surfactant typically has strong affinity for iron (including ions) such that between each batch synthesis an extensive reactor washing would be required.

The surfactant is preferably a lignin-based surfactant, more preferably a lignosulfonic acid or a salt thereof. Surprisingly, the inventors found that this surfactant produces a particularly stable ferrofluid. Without wishing to be bound by theory, it is believed that the ultrasonic treatment of the lignin-based surfactant results in the formation of hydroxyl and phenoxy radical species that may undergo a variety of reactions, including possible cross-linking of the lignin chains. This cross-linking is believed to be induced by hydroxyl (•OH) and superoxide (HO$_2$•) radicals that can be generated during the acoustic cavitation process. Transient cavitation generates hydroxyl radicals which may react with the phenolic groups of lignin and induce oxidation in the lignin backbone, which may allow further lignin polymerization or crosslinking. In case of the present ferrofluid production, ultrasonication not only disperses the nanoparticles during the ultrasonication process, but also polymerizes the lignin around the nanoparticles, thus creating solid cage-like structures. This adds steric repulsion which makes particle agglomeration unlikely. The steric repulsion, together with ionized groups on the polymer backbone result in very stable ferrofluid. The crosslinking effect has also been observed in a completely different application of lignin-based surfactants (see e.g. Tortora et al., Biomacromolecules 15 (2014) 1634-1643).

Typically, the ultrasonic waves for the coating have a frequency of 1 to 50 kHz, preferably 10 to 30 kHz such as about 20 kHz. Depending on the batch volume, the ultrasonication can be carried out for about 10 minutes up to about 2 hours.

Alternatively to ultrasonication, the coating of the nanosuspension (Ln) and the preparation of a stable ferrofluid can be carried out using attrition milling. Conventionally, ball milling or the modification thereof referred to as attrition milling (cf. Schilling et al., Attritors and Ball Mills How They Work, Presented at the Philadelphia Society For Coatings Technology Inc. Eastern Training Conference and Show May 9, 2000) can be used to grind particles of typically hundreds of microns down to the order of tens of nanometers in the presence of a dispersion medium and a coating agent (see e.g. U.S. Pat. No. 5,958,282). Since, the nanosuspension of the present invention already comprises nanoparticles of the desired size (in the order of nanometers), grinding is not required. However, the present inventors realized that the use of balls (e.g. steel balls) like in attrition milling can advantageous be used to disperse and coat the particles in the nanosuspension with the surfactant as well.

In the method of the present invention the attrition balls can be used for dispersing the magnetic nanoparticles and facilitate coating of said particles with the surfactant. Accordingly, the coating step preferably comprises mixing the nanosuspension with balls for attrition milling and milling for typically 30 minutes to about 5 hours at a typical speed of above 1500 rpms. For the sake of clarity, it is noted that the use of the attrition balls in accordance with the present invention is referred as attrition milling, even though actual grinding (in the sense of size reduction, which is common in conventional milling), is not required or not actually taking place in the present invention. The balls used for the milling in accordance with the present invention typically have a diameter in the range of less than 10 mm, preferably less than 5 mm, more preferably in the range of 0.5 to 3 mm, most preferably about 1 mm or less.

The inventors further surprisingly found that the coating of the particles in the nanosuspension by employing a combination of ultrasonication and balls (as used for the attrition milling) enables the preparation of a very stable ferrofluid in a relatively short time frame. Accordingly, in a particularly preferred embodiment, the coating of the particles is carried out by contacting the nanosuspension with a surfactant and balls, preferably metallic balls such as steel balls, and applying ultrasonic waves to the nanosuspension to coat the nanoparticles with said surfactant.

The balls used may be the same as used in the attrition milling or may be smaller, preferably 1 mm in diameter of less. Preferably the balls are 1 mm or smaller in diameter (in such case also referred to as beads), so that they can tumble and/or vibrate rapidly due to the sonication waves.

Figure 3:
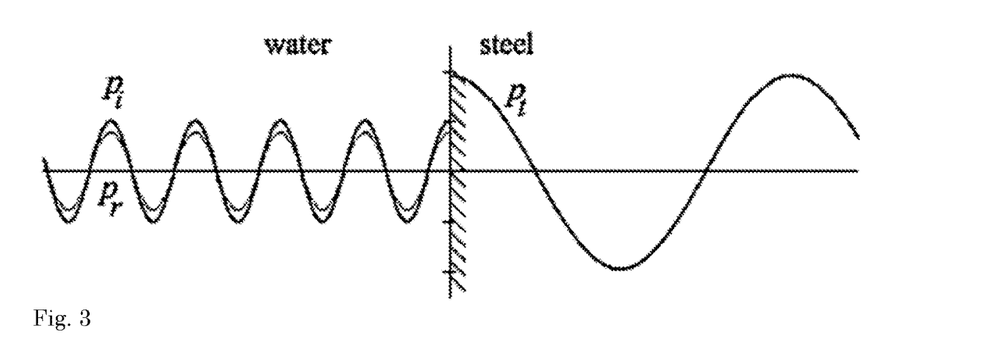
In FIG. 3, reflection of ultrasonic wave at a water-steel interface and the effect thereof on the amplitudes is illustrated.

Without wishing to be bound by theory, the present inventors believe that the improved coating by a combination of ultrasonication and balls may be the result of the small mechanical movement of the balls or beads (supported by the finding that smaller balls are preferred) because the tumbling of balls and beads causes very efficient aggregate dispersion (the beads ideally vibrate with ~20 kHz so collisions are much faster than with fastest attrition mill equipment available on the market). In addition, it is believed that steel balls can reflect the sonication wave causing much more uniform power distribution in the sonication medium (e.g. fluid, volume or otherwise). The present inventors realized that during ultrasonication in a steel container (also without balls being present), about 98-99% of the sonic energy is reflected at the water-steel interface. In FIG. 3, such reflection and the effect thereof on the amplitudes is illustrated. The reflected wave amplitude ($p_r$) is nearly the same as the incident amplitude ($p_i$), where the transmitted (stress) amplitude ($p_t$) is nearly twice the incident amplitude. The inventors realized that this principle can be effectively used for distribution of the power by steel balls. For this embodiment of the invention, milling is thus not required although it may be employed as well.

For mechanically coating the particles in the nanosuspension (either by attrition milling and/or ultrasonication in the presence of the balls), it is preferable that the balls are of a hard material and are capable of reflecting sonication energy. As such, metallic or ceramic balls are preferred. Steel balls are most preferred, in particular since these enable the power distribution of the ultrasonic waves during sonification. The balls preferably have a diameter in the range of up to 5 mm, preferably between 0.3 mm and 3 mm, more preferably 1 mm or less.

In preferred embodiments, fluids in the present invention are pumped by using peristaltic pumps of which the pump mechanism does not need to come in contact with the fluid being pumped. So, the application of such pumps may be particularly advantageous when working with acidic solutions which may corrode the mechanism and/or suspended particles which may clog the mechanism.

In a further aspect, the invention is directed to a system for producing a ferrofluid, the system comprising:
  a first supply chamber for supplying the stock solution;
  a second supply chamber for supplying the base;
  a mixing container configured to receive and mix the stock solution with the base, wherein the stock solution reacts with the base to form the suspension of nanoparticles
  a third supply chamber for supplying the washing solution to the mixing container;
  a waste container for receiving waste liquid from the mixing container;
  a magnet configured to enable immobilization of the nanoparticles;
  a fourth supply chamber for supplying the surfactant.

In a preferred embodiment, the system further comprises a collection vessel configured to receive and mix the nanoparticles with the surfactant to form a nanosuspension and an ultrasonic unit configured to receive the nanosuspension and apply ultrasonic waves to the nanosuspension to disperse and coat the particles with the surfactant thereby producing the ferrofluid.

Figure 1:
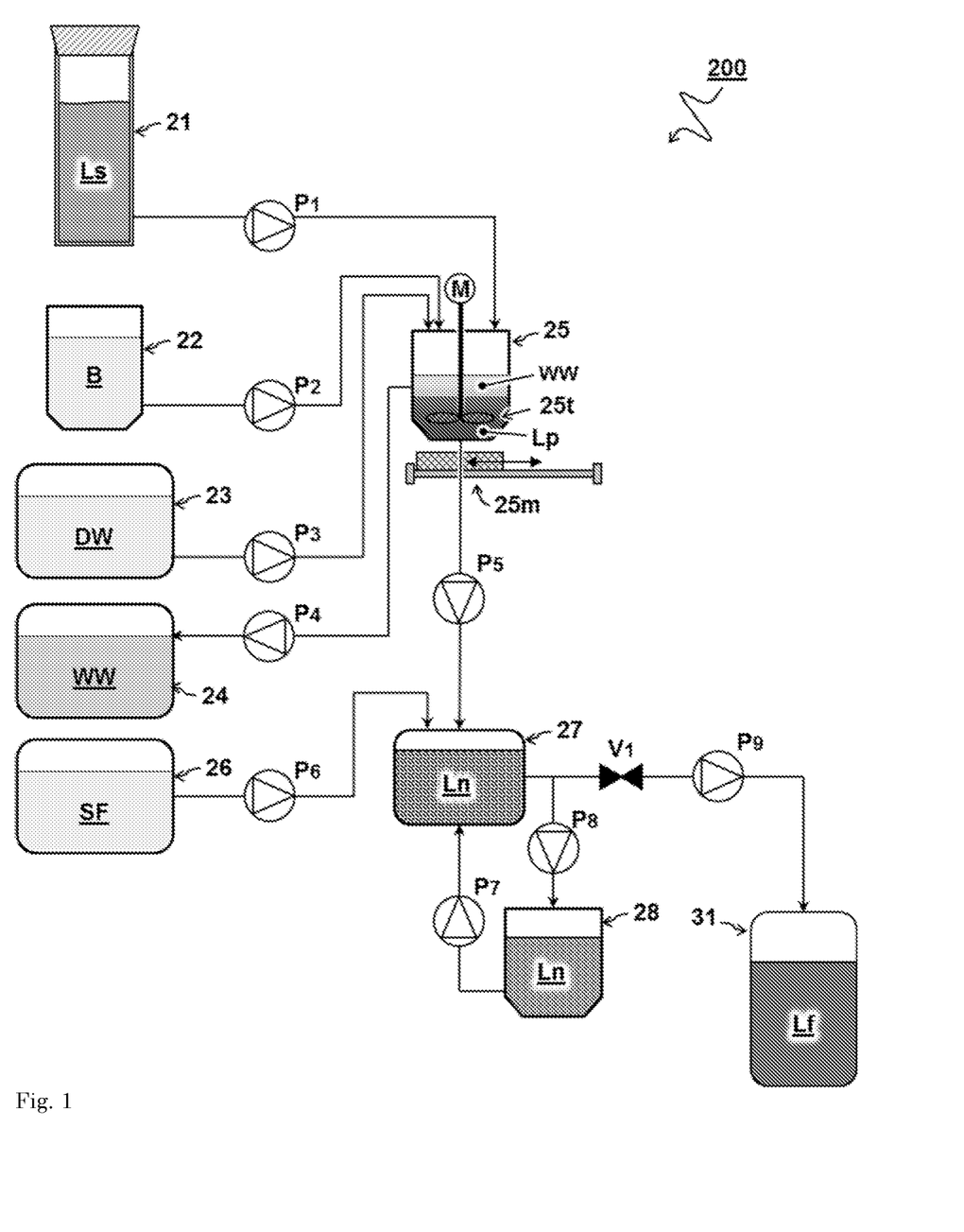

FIG. 1 illustrates a particularly preferred system 200 for producing the ferrofluid Lf. This illustrated system comprises the first supply chamber 21 for supplying the stock solution Ls; the second supply chamber 22 for supplying a base B; the mixing container 25 configured to receive and mix the stock solution Ls with the base B, wherein the stock solution Ls reacts with the base B to form a suspension of nanoparticles Lp. The third supply chamber 23 is provided for supplying demineralized water DW to the mixing container 25, as well as a waste container 24 for receiving waste water from the mixing container 25. Magnet 25m is configured to allow immobilization of the nanop articles. The system 200 further comprises a fourth supply chamber 26 for supplying a surfactant SF; a batch collection vessel 27 configured to receive and mix the nanoparticles Lp with the surfactant SF to form a nanosuspension Ln; an ultrasonic unit 28 configured to receive and apply ultrasonic waves to the nanosuspension Ln to disperse and coat the particles with the surfactant thereby producing the ferrofluid Lf.

In a preferred embodiment, the ultrasonic unit 28 comprises the balls used for the coating step.

The system may further include pumps P1-P9 and valve V1. The washing cycle of the systems can be carried out as follows:
  mixing tool 25t switched off
  magnet 25m moved in below the mixing container 25
  wait for particles to settle
  pump P4 activated for removal of waste water WW
  magnet 25m moved out
  pump P3 activated for input of demineralized water DW
  mixing tool 25t switched on
  mixing tool 25t switched off
  magnet 25m moved in below the reactor
  wait for particles to settle
  pump P4 activated for removal of waste water WW
  washing cycle is repeated, e.g. four times.

The coating of the nanosuspension Lp can then be carried out as follows:
  pump P5 activated for supplying the nanosuspension Lp into collection vessel 27
  pump P6 activated for supplying the surfactant SF into collection vessel 27
  pump P8 activated for supplying the nanosuspension Ln to the ultrasonic unit 28
  optional pump P7 is activated for circulating the nanosuspension Ln back to the collection vessel
  valve V1 opened and pump P9 activated to supply ferrofluid Lf into product vessel 31.

Pump P7 is optionally present. In a particular embodiment, the ultrasonic unit 28 comprises a flow cell of which the in- and outlet are connected to vessel 27. As such, the nanosuspension can be led through the ultrasonic unit 28 by activating pump P8 only.

Figure 2:
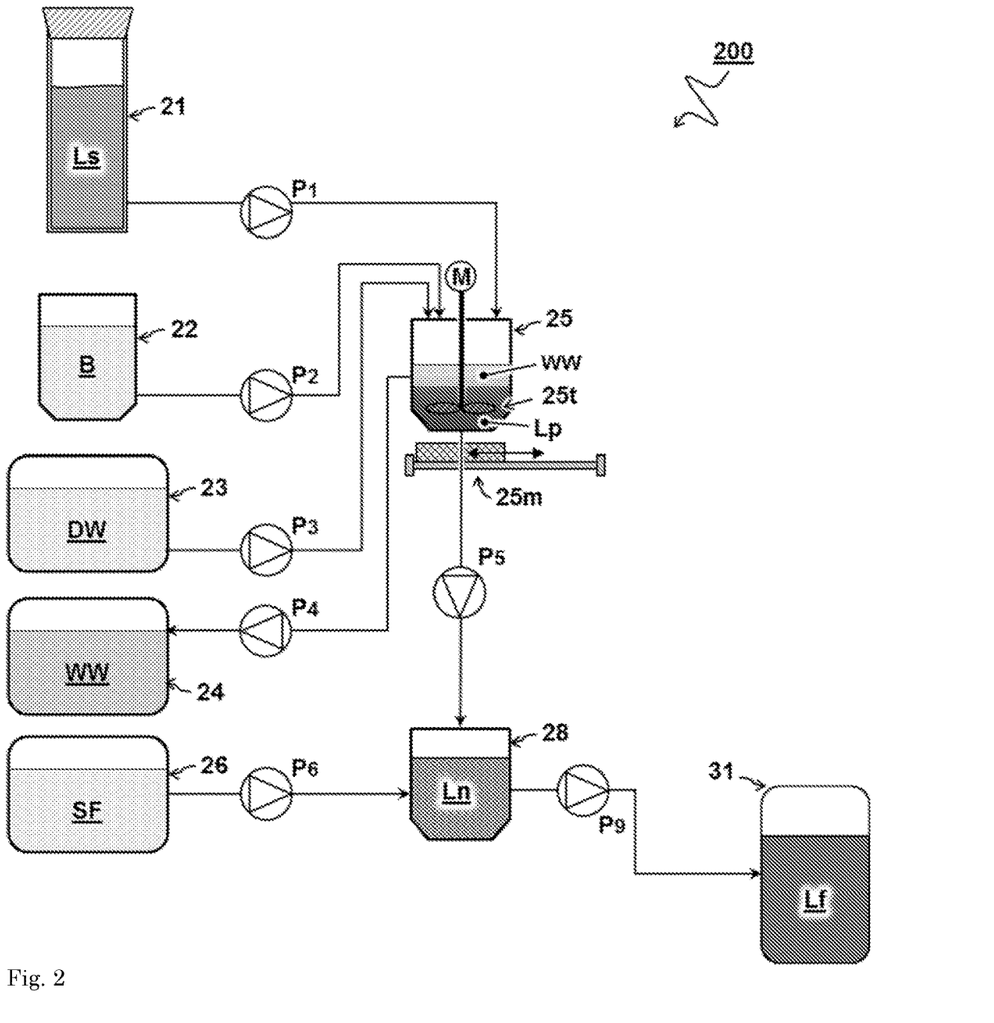

In an alternative embodiment to the above embodiments, the setup including the loop comprising the collection vessel 27, the ultrasonic unit 28 and pumps P7 and P8 and the fourth supply chamber 26 for supplying a surfactant SF each connected to the collection vessel 27 may be substituted by a setup wherein said sonication unit 28 is connected to the mixing container 25, to the fourth supply chamber 26 and to the product vessel 31. This particular embodiment is illustrated in FIG. 2. For this embodiment, using a large industrial sonication bath filled with said balls as the ultrasonic unit 28 is particularly preferred. The coating of the nanosuspension Lp can then be carried out as follows:
  pump P5 activated for supplying the nanosuspension Lp into ultrasonic unit 28
  pump P6 activated for supplying the surfactant SF into ultrasonic unit 28
  ultrasonic unit 28 is switch on and ultrasonic waves are provided to the nanosuspension Ln
  pump P9 activated to supply ferrofluid Lf into product vessel 31.

Figure 4:
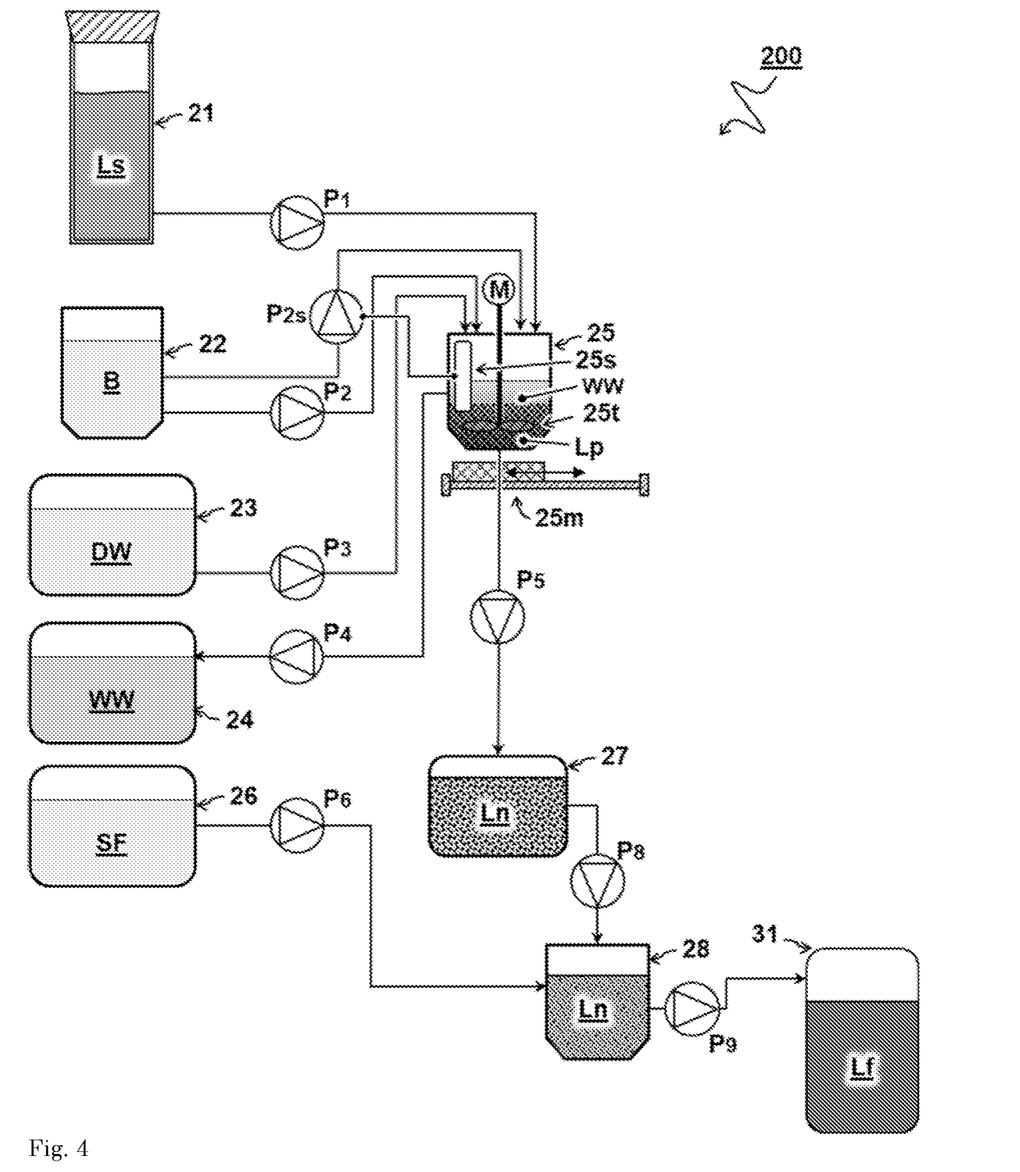

To control the pH and the amount of base added to the mixing container, the system preferably further comprises a pH sensor 25s that is controllably connected to pump P2s (e.g. a small peristaltic pump). An embodiment hereof is illustrated in FIG. 4, which setup further compares to that of FIG. 2, but it may be appreciated that the pH sensor and pump P2s can just as well be used in an embodiment as illustrated in FIG. 1. The pH sensor (25s) and pump P2s are adapted and connected such that during operation the pH of the reaction mixture in the mixing container can be maintained within a certain pH range by the addition of the base from the second supply container (22). As described hereinabove, precise pH control during the mixing of the base and the stock solution allows good control over the average particle size of the nanoparticles.

The process according to the present invention advantageously prevents the requirement of organic solvents, increased process temperatures and long process times as is the case in conventional preparation processes. The total process time of the present process can advantageously be in the range of 30 to 50 minutes per batch of about 1 L with ferrofluid's saturation magnetization in the range of 1000 to 8000 A/m. Moreover, the process can be carried out using only aqueous solutions. As such, the nanop articles can remain in an aqueous phase throughout the process. This also enables an efficient preparation of an aqueous ferrofluid and limits or even prevents waste that require special purification treatments. For instance, the process according to the present invention can produce only waste stream similar in composition to sea water, which may be discarded in regular waste water streams and can be purified together with regular waste water (e.g. domestic waste water).

For the purpose of clarity and a concise description, features are described herein as part of the same or separate embodiments, however, it will be appreciated that the scope of the invention may include embodiments having combinations of all or some of the features described.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise, it will be understood that when a connection between structures or components is described, this connection may be established directly or through intermediate structures or components unless specified otherwise.

The invention can be illustrated with the following examples.

Example 1—Sonication

Washed, uncoated magnetite nanosuspension (850 mL) was transferred to a collection vessel to which 150 ml of 10% aqueous surfactant solution were added. The mixture is then circulated through an ultrasonic unit flow cell which applied ultrasonic waves to the nanosuspension in order to disperse and coat the particles with the surfactant. After approximately 30 minutes a stable ferrofluid is produced.

Example 2—Laboratory Attrition Milling Setup

In a setup comprising a steel impeller with splash protection, a motor and a container to which a nanosuspension, grinding medium and surfactant (lignosulfonic acid) were added. Steel balls (~5 mm in diameter & 1 mm in diameter) were used as a dispersing medium.

The nanosuspension was prepared by providing magnetite nanop articles from a stock solution as described in NL2022821, wherein the stock solution was used for a precipitation reaction and formation of magnetite nanosuspension using alkaline base, followed by allowing the particles to settle. The supernatant was then removed and the remaining magnetite agglomerates were used for testing.

When stirred for few hours a stable suspension was formed.

Example 3—Beads Assisted Sonication

A glass container to which a uncoated magnetite nanosuspension (50 ml), steel balls (50 ml, 1 mm in diameter) and surfactant (lignosulfonic acid, 0.9 g) were added, was placed in a low power laboratory sonication bath. Already after 2 hours of low power sonication a sample taken and placed on a magnet was stable for 24 hours—no visible precipitate was formed.

Example 4—Production of an Aqueous Ferrofluid with Nanoparticles of a 9.5 nm Average Particles Size An aqueous solution of NaOH was added to an aqueous stock solution comprising $FeCl_2$ and $FeCl_3$ until solution with a pH of 8 is obtained. Then, the pH of the reaction mixture is maintained at about 8.5 for about 10-20 minutes. The resulting nanoparticles are separated from the spent stock solution and washed with demineralized water until nanosuspension with an electrical conductivity of less than 1 mS/cm is obtained. Next, the nanoparticles were coated with lignosulfonic acid in accordance with example 1. An aqueous ferrofluid comprising nanoparticles with an average particle size of about 9.5 nm was obtained.

Example 5—Production of an Aqueous Ferrofluid with Nanoparticles of a 11 nm Average Particle Size Nanoparticles were produced in a similar process as described in Example 4. However, in a first step, an aqueous solution of NaOH was added to an aqueous stock solution comprising $FeCl_2$ and $FeCl_3$ to obtain a reaction mixture having a pH of just under 4. This pH was maintained for about 10 min. Then additional base was added and, as in Example 4, the pH of the mixture is maintained at about 8.5 for about 10-20 minutes. The resulting nanoparticles were further processed as described in Example 4. An aqueous ferrofluid comprising nanoparticles with an average particle size of about 11 nm was obtained.

Example 6—Production of an Aqueous Ferrofluid with Nanoparticles of a 7 nm Average Particle Size An aqueous solution of NaOH was added to an aqueous stock solution comprising $FeCl_2$ and $FeCl_3$ until solution with a pH of below 12, preferably 11 is obtained. After about 5-10 minutes, the resulting nanoparticles are separated from the spent stock solution and washed with demineralized water until nanosuspension with an electrical conductivity of 1 mS/cm is obtained. Next, the nanoparticles were coated with lignosulfonic acid in accordance with example 1. An aqueous ferrofluid comprising nanop articles with an average particle size of about 7 nm was obtained.

The invention claimed is:

1. A method of producing a ferrofluid, comprising
providing a stock solution with Fe (II) and Fe (III);
mixing the stock solution with a base to form magnetic nanoparticles and a spent solution;
a separation step of separating the nanoparticles from the spent solution by applying a magnet to immobilize the nanoparticles and remove at least part of the spent solution as supernatant from the immobilized nanoparticles;
one or more additional washing steps following the separation step, each washing step comprising releasing the nanoparticles from the magnetic immobilization, mixing the released nanoparticles with a washing solution which comprises water, re-immobilizing the nanoparticles with the magnet and removing at least part of the used washing solution as supernatant from the immobilized nanoparticles to form a nanosuspension comprising the nanoparticles; and a coating step wherein the nanoparticles in the nanosuspension are coated with a surfactant.

2. The method in accordance with claim 1, wherein mixing the stock solution with the base comprises maintaining the pH in a range between about 7.5 and about 8.5 for about 5 to about 30 minutes.

3. The method in accordance with claim 1, comprising at least two.

4. The method in accordance with claim 1, wherein the nanosuspension obtained from the washing steps has an electrical conductivity of less than 1 mS/cm.

5. The method in accordance with claim 1, wherein the magnet is switchable to intermittently pull or immobilize the nanoparticles such that a significant fraction of the supernatant can be removed in the separation and washing steps.

6. The method in accordance with claim 1, wherein the magnet comprises a permanent magnet on a motorized stage to controllably place the permanent magnet adjacent the mixing container or wherein the magnet comprises a switchable electromagnet.

7. The method in accordance with claim 1, wherein the magnet is arranged in a Halbach arrangement.

8. The method in accordance with claim 1, wherein the coating step comprises contacting the nanosuspension with the surfactant and attrition balls followed by milling the mixture to disperse and coat the nanoparticles with said surfactant, thereby producing the ferrofluid.

9. The method in accordance with claim 8, wherein said balls are capable of reflecting sonication energy.

10. The method in accordance with claim 8, wherein said balls have a diameter in the range of up to 5 mm.

11. The method in accordance with claim 1, wherein the coating step comprises contacting the nanosuspension with the surfactant and with balls, and applying ultrasonic waves to the nanosuspension to disperse and coat the nanoparticles with said surfactant, thereby producing the ferrofluid.

12. The method in accordance with claim 1, wherein the surfactant comprises a lignin-based surfactant.

* * * * *